United States Patent
Ajanovic et al.

(10) Patent No.: US 6,516,375 B1
(45) Date of Patent: Feb. 4, 2003

(54) PERIPHERAL COMPONENT INTERCONNECT (PCI) CONFIGURATION EMULATION FOR HUB INTERFACE

(75) Inventors: Jasmin Ajanovic, Portland, OR (US); David J. Harriman, Sacramento, CA (US); Serafin E. Garcia, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/433,275

(22) Filed: Nov. 3, 1999

(51) Int. Cl.$^7$ .............................................. G06F 13/10
(52) U.S. Cl. ...................... 710/305; 370/912
(58) Field of Search ........................ 710/60, 61, 36, 710/107, 104, 305, 240; 709/203, 227, 250, 238, 201, 1, 220; 707/10, 200; 370/392, 461, 912; 703/14, 15; 711/203

(56) References Cited

U.S. PATENT DOCUMENTS

| | | |
|---|---|---|
| 5,191,649 A | 3/1993 | Cadambi et al. |
| 5,469,435 A | 11/1995 | Krein et al. |
| 5,533,204 A | 7/1996 | Tipley |
| 5,553,310 A | 9/1996 | Taylor et al. |
| 5,574,868 A | 11/1996 | Marisetty |
| 5,590,292 A | 12/1996 | Wooten et al. |
| 5,621,897 A | 4/1997 | Boury et al. |
| 5,675,813 A | 10/1997 | Holmdahl |
| 5,687,388 A | 11/1997 | Wooten et al. |
| 5,761,444 A | 6/1998 | Ajanovic et al. |
| 5,802,055 A | 9/1998 | Krein et al. |
| 5,832,243 A | 11/1998 | Seeman |
| 5,835,739 A | 11/1998 | Bell et al. |
| 5,870,567 A | 2/1999 | Hausauer et al. |
| 5,881,255 A | 3/1999 | Kondo et al. |
| 5,889,968 A | 3/1999 | Bennett et al. |
| 5,909,594 A | 6/1999 | Ross et al. |
| 5,911,052 A | 6/1999 | Singhal et al. |
| 5,913,218 A * | 6/1999 | Carney et al. |
| 5,918,025 A | 6/1999 | Hayek et al. |
| 5,930,485 A | 7/1999 | Kelly |
| 5,933,612 A | 8/1999 | Kelly et al. |
| 5,944,805 A | 8/1999 | Ricks et al. |
| 5,978,874 A | 11/1999 | Singhal et al. |
| 5,991,824 A | 11/1999 | Strand et al. |
| 5,996,036 A | 11/1999 | Kelly |
| 6,012,118 A | 1/2000 | Jayakumar et al. |
| 6,021,456 A | 2/2000 | Herdeg et al. |
| 6,061,693 A * | 5/2000 | Carney et al. |
| 6,145,039 A | 11/2000 | Ajanovic et al. |
| 6,175,884 B1 | 1/2001 | Harriman et al. |
| 6,374,317 B1 * | 4/2002 | Ajanovic et al. |

FOREIGN PATENT DOCUMENTS

| | | |
|---|---|---|
| WO | WO 00/26763 | 5/2000 |
| WO | WO 00/26798 | 5/2000 |
| WO | WO 00/26801 | 5/2000 |
| WO | WO 01/27777 A1 | 4/2001 |
| WO | WO 01/31460 A1 | 5/2001 |

OTHER PUBLICATIONS

U.S. Patent Application No. 09/414,377, filed Oct. 7, 1999, entitled "Method and Apparatus for Initializing a Computer Interface" by Jasmin Ajanovic, Serafin Garcia, and David J. Harriman (50 pages total).

* cited by examiner

Primary Examiner—Gopal C. Ray
(74) Attorney, Agent, or Firm—Blakely, Sokoloff, Taylor & Zafman LLP

(57) ABSTRACT

A configuration access request packet is transmitted from a first hub agent onto a hub interface. The configuration access request packet comprises an address formatted in accordance with a peripheral component interconnect (PCI) specification. The configuration access request packet is received from the hub interface by a second hub agent.

30 Claims, 11 Drawing Sheets

600

| BYTE 7 | BYTE 6 | BYTE 5 | BYTE 4 | BYTE 3 | BYTE 2 | BYTE 1 | BYTE 0 |
|---|---|---|---|---|---|---|---|
| ADDRESS (32b) |||| REQUEST HEADER ||||
| SECOND DW OF DATA |||| FIRST DW OF DATA ||||
| {BOGUS DW} |||| THIRD DW OF DATA ||||

| BYTE 7 | BYTE 6 | BYTE 5 | BYTE 4 | BYTE 3 | BYTE 2 | BYTE 1 | BYTE 0 |
|---|---|---|---|---|---|---|---|
| ADDRESS (31:2) |||| REQUEST HEADER ||||
| {BOGUS DW} |||| ADDRESS (63:32) ||||
| SECOND DW OF DATA |||| FIRST DW OF DATA ||||
| {BOGUS DW} |||| THIRD DW OF DATA ||||

FIG. 7

PERIPHERAL COMPONENT INTERCONNECT (PCI) CONFIGURATION EMULATION FOR HUB INTERFACE

BACKGROUND OF THE INVENTION

1. Field of the Invention

The present invention relates generally to the field of computer systems. More particularly, the present invention relates to the field of device configuration for computer systems.

2. Description of Related Art

A typical personal computer (PC) system implements one or more standardized buses to enable one or more peripheral components to communicate with a processor and/or a main memory, for example, in the computer system. A standardized bus with expansion slots allows for the use of any one or more of a variety of plug-in peripheral components in the computer system. Exemplary standardized buses include an industry standard architecture (ISA) bus which supports an 8-bit or 16-bit data path at 8 MegaHertz (MHz) and an Extended ISA (EISA) bus which supports a 32-bit data path at 8 MHz with bus mastering.

A peripheral component interconnect (PCI) bus has also been developed. The PCI bus supports 32-bit and 64-bit data paths at 33 or 66 MHz and bus mastering and therefore provides a higher speed data path between peripheral components on the PCI bus and a processor. The PCI bus also supports plug and play (PnP) capability for automatic configuration of plug-in peripheral components on the PCI bus. Typically, the computer system provides PnP capability with suitable programming in its basic input/output system (BIOS) and/or operating system (OS) software.

BRIEF SUMMARY OF THE INVENTION

A configuration access request packet is transmitted from a first hub agent onto a hub interface. The configuration access request packet comprises an address formatted in accordance with a peripheral component interconnect (PCI) specification. The configuration access request packet is received from the hub interface by a second hub agent.

BRIEF DESCRIPTION OF THE DRAWINGS

The present invention is illustrated by way of example and not limitation in the figures of the accompanying drawings, in which like references indicate similar elements and in which:

FIG. 6 illustrates, for one embodiment, exemplary framing for a request packet using 32-bit addressing and containing three double words of data;

FIG. 7 illustrates, for one embodiment, exemplary framing for a request packet using 64-bit addressing and containing three double words of data;

DETAILED DESCRIPTION

The following detailed description sets forth an embodiment or embodiments in accordance with the present invention for peripheral component interconnect (PCI) configuration emulation for hub interface. In the following description, details are set forth such as specific peripheral components, communication protocols, etc., in order to provide a thorough understanding of the present invention. It will be evident, however, that the present invention may be practiced without these details. In other instances, well-known computer components, etc., have not been described in particular detail so as not to obscure the present invention.

EXEMPLARY COMPUTER SYSTEM

Figure 1:
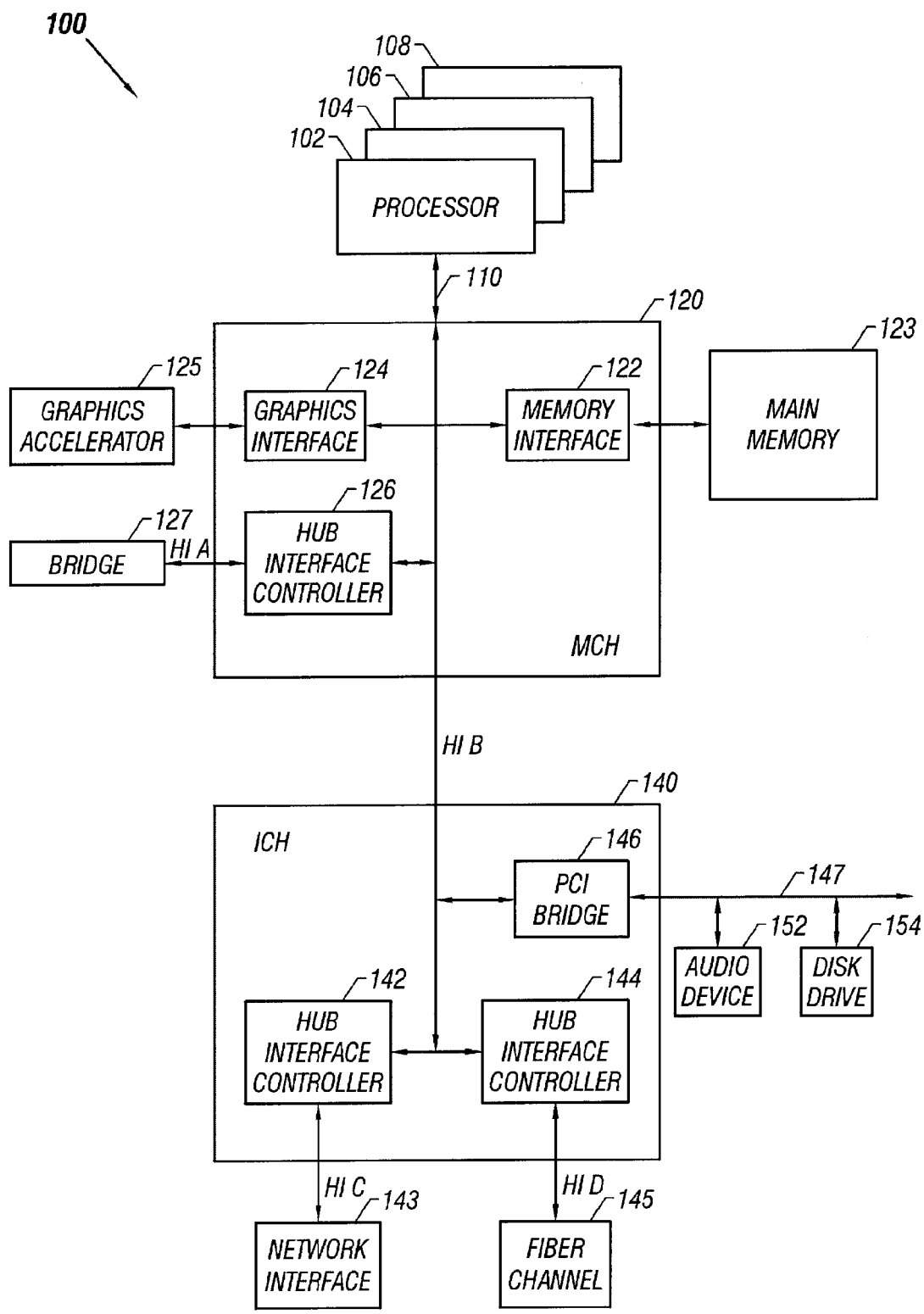
FIG. 1 illustrates, for one embodiment, a computer system in accordance with the present invention for peripheral component interconnect (PCI) configuration emulation for hub interface.

FIG. 1 illustrates an exemplary computer system 100 in accordance with the present invention for peripheral component interconnect (PCI) configuration emulation for hub interface. Although described in the context of system 100, the present invention may be implemented in any suitable computer system comprising any suitable combination of integrated circuits.

As illustrated in FIG. 1, system 100 comprises processors 102, 104, 106, and 108, a processor bus 110, a memory control hub agent (MCH) 120, and an input/output (I/O) control hub agent (ICH) 140. Processors 102, 104, 106, and 108 and MCH 120 are each coupled to processor bus 110. Processors 102, 104, 106, and 108 may each comprise any suitable processor, such as a processor in the Pentium® family of processors available from Intel Corporation of Santa Clara, Calif. for example. System 100 for other embodiments may comprise one, two, three, or more than four processors.

MCH 120 may comprise any suitable interface controllers to provide for any suitable communication link to processor bus 110 and/or any suitable device or component in communication with MCH 120. MCH 120 for one embodiment comprises a memory interface controller 122, a graphics interface controller 124, and a hub interface controller 126. Memory interface controller 122 is coupled to a main memory 123 that stores data and/or instructions, for example, for computer system 100. Main memory 123 may comprise any suitable memory, such as a dynamic random access memory (DRAM) for example. Graphics interface controller 124 is coupled to a graphics accelerator 125 through a suitable interface, such as an accelerated graphics port (AGP) or a hub interface for example. Hub interface controller 126 is coupled to a bridge 127 through a hub interface A. Bridge 127 provides an interface between MCH 120 and any suitable communication link.

MCH 120 is also coupled to ICH 140 through a hub interface B. ICH 140 provides an interface to I/O devices or peripheral components for system 100. ICH 140 may comprise any suitable interface controllers to provide for any suitable communication link to MCH 120 and/or to any suitable device or component in communication with ICH 140. For one embodiment, ICH 140 comprises a hub interface controller 142 coupled to a network interface controller 143 through a hub interface C, a hub interface controller 144 coupled to a fiber channel 145 through a hub interface D, and a peripheral component interconnect (PCI) bridge 146 coupled to a PCI bus 147. PCI bus 147 couples suitable PCI devices, such as an audio device 152 and a disk drive 154 for example, to ICH 140.

MCH 120 and ICH 140 are each formed as integrated circuits and may each comprise any suitable circuitry. MCH 120 and ICH 140 may also form at least a portion of a suitable chipset. For one embodiment where system 100 comprises only one processor 102, processor 102 may be combined with MCH 120 to form a single chip. Also, for one embodiment, graphics accelerator 125 may be included in MCH 120.

HUB INTERFACE

A hub interface is a mechanism for interconnecting main building blocks of the core logic of a computer system, such as system 100 for example, with a high bandwidth data path. As the PCI bus is designed to interface with a variety of I/O devices or peripheral components each with varying requirements, the PCI bus is not necessarily optimized for high speed communication between any two components or devices. Use of a hub interface to interconnect hub agents helps provide improved access between an I/O device coupled to one hub agent and a processor coupled to another hub agent as the hub interface is optimized for communication between the two hub agents. Use of hub interface B, for example, to interconnect MCH 120 and ICH 140 helps provide improved access between devices coupled to ICH 140 and devices coupled to MCH 120. Use of hub interfaces may also help improve the scalability of a computer system as hub interfaces may serve as backbones for I/O building blocks. Hub interfaces A, C, and D, for example, expand I/O access for system 100.

Devices coupled to one another through a hub interface are hub agents. Hub agents provide a central connection between two or more separate buses and/or other types of communication links. A hub agent positioned closer in distance along a bus to a processor is an upstream agent, and a hub agent positioned farther in distance along a bus from a processor is a downstream agent. For system 100, bridge 127 and ICH 140, for example, are downstream from MCH 120. Network interface controller 143, for example, is downstream from both MCH 120 and ICH 140.

Figure 2:
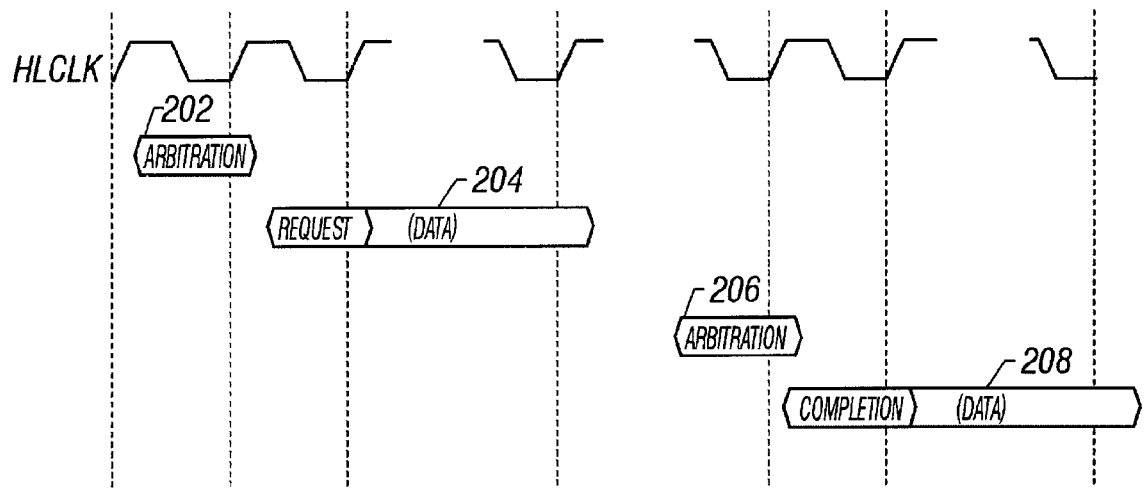
FIG. 2 illustrates, for one embodiment, an exemplary packet based split transaction protocol.

For one embodiment, transactions are transferred between two hub agents across a hub interface using a suitable packet based split transaction protocol. As an example of one such protocol, as illustrated in FIG. 2, an initiating one of the two hub agents obtains ownership of the hub interface through arbitration 202 and transmits, during a request phase 204, a request packet to initiate a transaction. For write type transactions, for example, the request packet may have associated data transmitted during request phase 204. When the requested transaction is completed and only if necessary or desired, the responding agent obtains ownership of the hub interface through arbitration 206 and transmits, during a completion phase 208, a completion packet to terminate the transaction. For read type transactions, for example, the completion packet may have associated data transmitted during completion phase 208. For some transactions, more than one completion packet may be transmitted, for example, where the completion packet is disconnected.

As a requested transaction is performed, that is in between the request packet and corresponding completion packet transmissions across the hub interface, other unrelated packets may be transmitted across the hub interface. As, for example, a read transaction requesting data from an I/O device coupled to ICH 140 for storage in main memory 123 may require multiple clock cycles before the data is ready to be returned in a completion packet from ICH 140 to MCH 120, MCH 120 during that time may transmit to ICH 140 other unrelated request and/or completion packets waiting in a transaction queue, for example, of MCH 120.

Hub interfaces for one embodiment use transaction descriptors for routing hub interface traffic and for identifying transaction attributes. As one example, a transaction descriptor may identify a transaction as isochronous or asynchronous, for example, to have the transaction handled in accordance with a predefined protocol.

Hub interfaces for one embodiment use a relatively narrow connection, that is with less pins or pads for example, in transmitting packets. Hub interfaces for one embodiment transmit packets in accordance with a source synchronous clock mode to help increase the bandwidth of the hub interface.

For greater clarity, the hub interface is described in three parts: a transaction layer, a protocol layer, and a physical layer. The distinctions between layers, however, is to be regarded in an illustrative rather than a restrictive sense and do not imply any particular implementation.

TRANSACTION LAYER

The routing of separate transactions transmitted across a hub interface is supported at the transaction layer. As one example, transaction descriptors are generated at the transaction layer. Transaction descriptors may be used to support arbitration between queues within a hub agent and/or to facilitate routing of packets through the hub interface. For one embodiment, transaction descriptors support routing of a completion packet back to a request initiating hub agent based on routing information contained in the corresponding request packet. Transaction descriptors may help minimize packet decoding logic within hub agents.

Transaction descriptors for one embodiment may also provide the ability to distinguish the handling of requests. Transaction descriptors, for example, may identify transactions as isochronous, that is transactions that move fixed amounts of data on a regular basis, such as for real time video or audio transactions for example. Transactions may therefore be handled in accordance with a corresponding routing protocol.

A transaction descriptor may comprise any suitable number of fields and for one embodiment comprises a routing field and an attribute field. The routing and attribute fields may each have any suitable size.

Figure 3:
FIG. 3 illustrates, for one embodiment, a routing field for a transaction descriptor.

FIG. 3 illustrates, for one embodiment, a routing field 300 comprising a hub identifier (Hub ID) field and a pipe identifier (Pipe ID) field for a transaction descriptor.

The Hub ID field identifies the hub agent that initiated the corresponding transaction. The Hub ID field for one embodiment comprises three bits to identify hub agents in a hub interface hierarchy that does not exceed eight hub agents. A hierarchy comprises one or more connected hub interface segments starting from a root hub agent, such as MCH 120 for example. A computer system may comprise more than one hierarchy in which case the hub agent at the top of the hierarchies should be capable of routing completions to the appropriate hierarchy. System 100, for example, comprises multiple hub interface hierarchies. For embodiments implementing a hub interface hierarchy exceeding eight hub agents, the Hub ID field may comprise more than three bits.

The Pipe ID field identifies internal pipes or queues within a hub agent. As one example, ICH 140 may support internal universal serial bus (USB) host controller traffic and bus mastering integrated device electronics (BM-IDE) traffic using separate pipes. The Pipe ID may be used to communicate to a servicing hub agent, such as MCH 120 for example, that traffic initiated by different pipes have different attributes and are to be handled in accordance with a predetermined protocol. The Pipe ID field for one embodiment comprises three bits. If a hub agent does not implement separate internal pipes, a default value of 000 may be used for the Pipe ID.

The attribute field in a transaction descriptor specifies how the corresponding transaction is to be handled when a target hub agent receives it. The attribute field for one embodiment comprises three bits. The attribute field may help a computer system support a demanding application workload, which relies on the movement and processing of data with specific requirements or other differentiating characteristics. As one example, the attribute field may support the isochronous movement of data between devices. The attribute field for other embodiments may differentiate between snooped traffic where cache coherency is enforced by hardware and non-snooped traffic that relies on software mechanisms to ensure data coherency. Another possible transaction attribute is an explicitly prefetchable hint to support a form of read caching and allow for more efficient use of main memory bandwidth, for example.

Transaction descriptors may also be used to support ordering rules among transactions transmitted over a hub interface. Transactions executed over a hub interface may be ordered in any suitable manner. As examples, transactions with identical transaction descriptors may be executed in strong order, that is first come, first serve. Transactions having the same routing field but different attribute fields may be reordered with respect to one another. Isochronous transactions, for example, do not need to be strongly ordered with respect to asynchronous transactions. Data transmissions may be ordered ahead of requests, either in the same or opposite directions, over a hub interface. Read completions may be ordered ahead of read requests in the same direction. Write requests may be ordered ahead of read requests in the same direction. For one embodiment, ordering rules in accordance with a suitable PCI Specification, such as PCI Specification Revision 2.2 for example, may be used to determine the flow of traffic across a hub interface in opposite directions.

PROTOCOL LAYER

For one embodiment, as discussed in connection with. FIG. 2, each hub interface transaction uses a packet-based protocol with two types of packets: request and completion. A request packet is used to initiate each hub interface transaction. Completion packets are used where required or desired, for example, to return read data or to acknowledge completion of a write transaction, such as an I/O or memory write with requested completion for example. Completion packets are associated with their corresponding request packets by transaction descriptors and ordering, for example.

The hub interface for one embodiment uses a symmetric and distributed arbitration protocol. As one example, each hub agent drives its request signal which is observed by the other hub agent across the hub interface. No grant signal is used, and agents determine ownership of the hub interface independently. Also, the hub interface may not use explicit framing signals. Rather, the arbitration event that gives a hub agent ownership of the hub interface implies the start of that hub agent's transmission. For other embodiments, grant and/or framing signals may be used. A hub agent owning the hub interface for packet transmission releases control of the hub interface by deasserting its request signal. For one embodiment, flow control is also accomplished by using a STOP signal to retry or disconnect packets.

The hub interface for one embodiment transfers data at a multiple rate, such as 1×, 4×, or 8× for example, of a hub interface clock (HICLK). The hub interface clock for one embodiment is a common clock shared by hub agents across a hub interface. Data is transmitted across a data signal path (PD) of the hub interface. The data signal path may have any suitable interface width, such as an interface width of some power of two for example. By varying the transfer rate and/or the interface width of the data signal path, the transfer;width, that is the number of bytes transferred per hub interface clock, may be scaled. With an 8-bit interface width in 4× mode, for example, the transfer width is thirty-two bits per hub interface clock.

Figure 4:
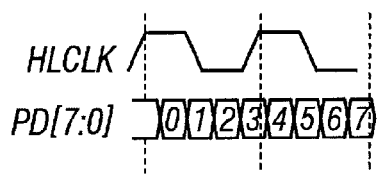
FIG. 4 illustrates, for one embodiment, an exemplary byte transmission order over an 8-bit interface width in 4× mode.
Figure 5:
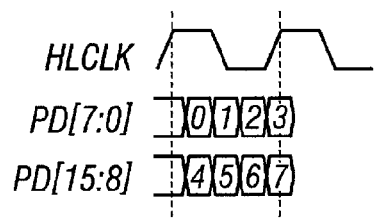
FIG. 5 illustrates, for one embodiment, an exemplary byte transmission order over a 16-bit interface width in 4× mode.

For one embodiment, packets may be larger than a transfer width and transmitted in multiple sections or packet widths of any suitable size, such as a double word or 32-bit size for example, in any suitable manner. A 64-bit packet, for example, may be divided into two 32-bit packet widths for transmission over an 8-bit interface width in 4× mode. The packet widths for one embodiment are presented on the data signal path in order from least to most significant packet width, and the bytes of each packet width are presented on the data signal path in order from least to most significant byte, as illustrated in FIG. 4. For transmission of that same packet over a 16-bit interface width in 4× mode, as illustrated in FIG. 5, for one embodiment, the least significant packet width is presented on the lower byte of the data signal path, that is PD[7:0], with each byte of the least significant packet width presented in order from least to most significant byte. The most significant packet width is presented on the upper byte of the data signal path, that is PD[15:8], with each byte of the most significant packet width presented in order from least to most significant byte.

For one embodiment, the information in each packet is framed at the protocol layer of the hub interface in accordance with a set of framing rules that define how to map a packet of one or more packet widths onto a set of transfer widths. The hub interface may frame information in each packet in accordance with any suitable framing rules. For one embodiment, the hub interface frames information in each packet such that a header section of the packet starts on the first byte of a transfer width, a data section of the packet, if any, starts on the first byte of a transfer width, and the packet occupies an integral number of transfer widths. Any available transfer widths not consumed by a packet may be filled with a bogus transmission that is to be ignored by the receiving hub agent. FIG. 6 illustrates one example of how a request packet 600 using 32-bit addressing and containing 3 double words of data may be framed. FIG. 7 illustrates one example of how a request packet 700 using 64-bit addressing and containing 3 double words of data may be framed. Exemplary request packets 600 and 700 may be framed as illustrated, for example, for a 64-bit transfer width using a 16-bit interface width.

Figure 8:
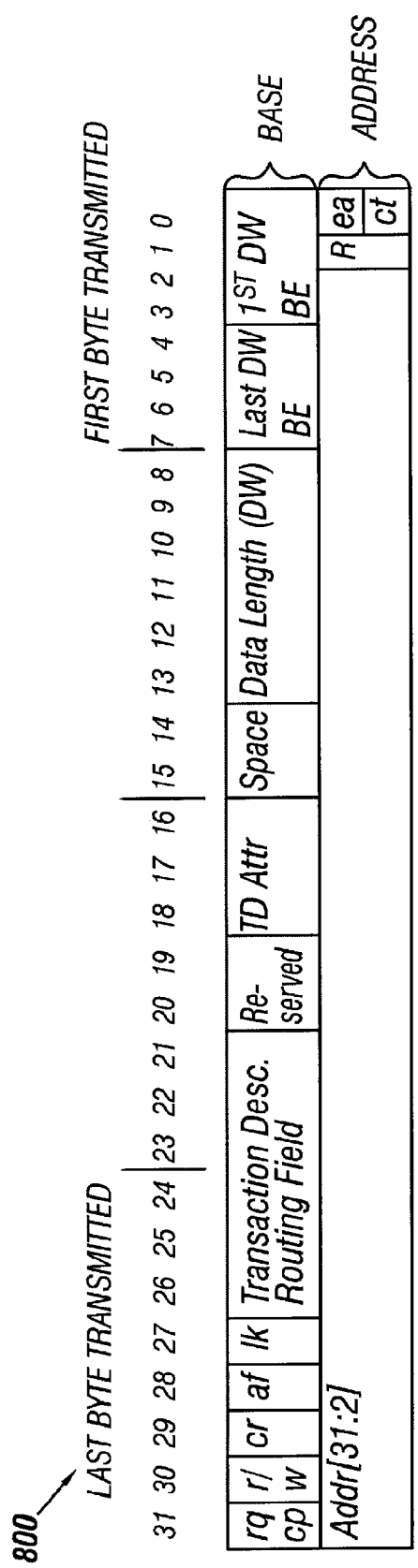
FIG. 8 illustrates, for one embodiment, an exemplary packet header for request packets using 32-bit addressing.
Figure 9:
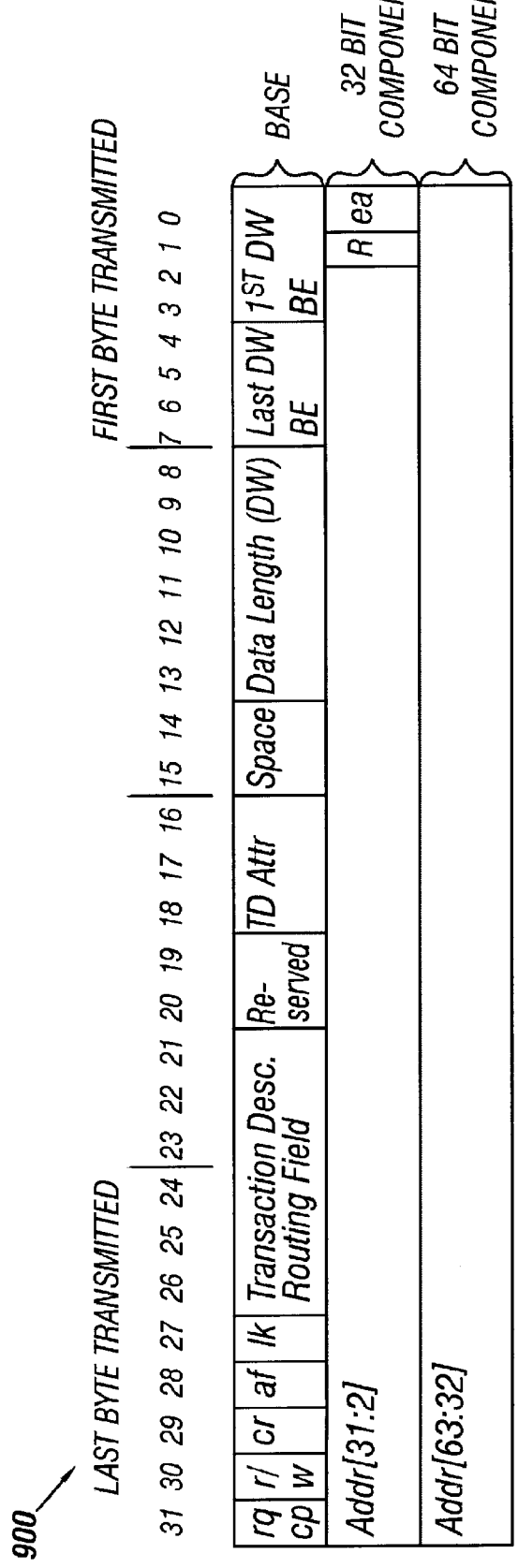
FIG. 9 illustrates, for one embodiment, an exemplary packet header for request packets using 64-bit addressing.

Each request packet may have any suitable information encoded in any suitable format. FIG. 8 illustrates an exemplary packet header 800 for request packets using 32-bit addressing, and FIG. 9 illustrates an exemplary packet header 900 for request packets using 64-bit addressing. For the examples of FIGS. 8 and 9, each packet header 800 and 900 has a base header of one double word size. The fields of each exemplary packet header 800 and 900 are described in Table 1.

TABLE 1

Request Packet Header Fields

| | |
|---|---|
| Transaction Descriptor | Transaction routing and attribute fields. |
| rq/cp | Request packets are identified with a 0 and completion packets with a 1 in this location. |
| cr | Completion required (1) or no completion required (0). |
| r/w | Read (0) or Write (1). This field indicates if data is included with a completion (read) or a request (write). |
| Address Format (af) | The addressing format is either Implied (0) or 32/64 bit (1). |
| Lock (lk) | Flag to indicate that the request is part of a locked sequence. Requests and completions in a locked sequence have this bit set. Hub agents which do not comprehend lock ignore this flag and fill this field with 0. |
| Data Length | The data length is given in double words encoded such that the number of double words represented is one plus this number. Thus, 000000 represents one double-word. |
| Space | This field selects the destination space type for the request. For one embodiment, possible destination spaces include memory (00), I/O (01), and configuration (10). |
| 1$^{st}$ DW BE | Byte enables for the first double word of any read or write request to memory, I/O, or configuration spaces. Byte enables are active low. If there is only one double word for a request, this byte enable field is used. For one embodiment, memory, I/O, or configuration read or write requests cannot be issued with no bytes enabled. |
| Last DW BE | Byte enables for the last double word of any read or write request. Byte enables are active low. If there is only one double word for a request, this field is inactive (1111). Byte enables may be discontiguous (e.g., 0101). |
| Addr[31:2] | The 32 bit address is generated as it would be on PCI for same type of cycle. This double word is included for the 32 and 64 bit addressing modes. |
| Extended Address (ea) | Indicates 32 bit addressing (0) or 64 bit addressing (1). |
| Config Type (ct) | For configuration cycles only, this bit is used to indicate Type 0 (0) or Type 1 (1) configuration cycle type. Because configuration cycles are performed with 32 bit addressing, this bit is overlapped with the Extended Address bit. |
| Addr[63:32] | Upper address bits for 64 bit addressing mode. |

Figure 10:
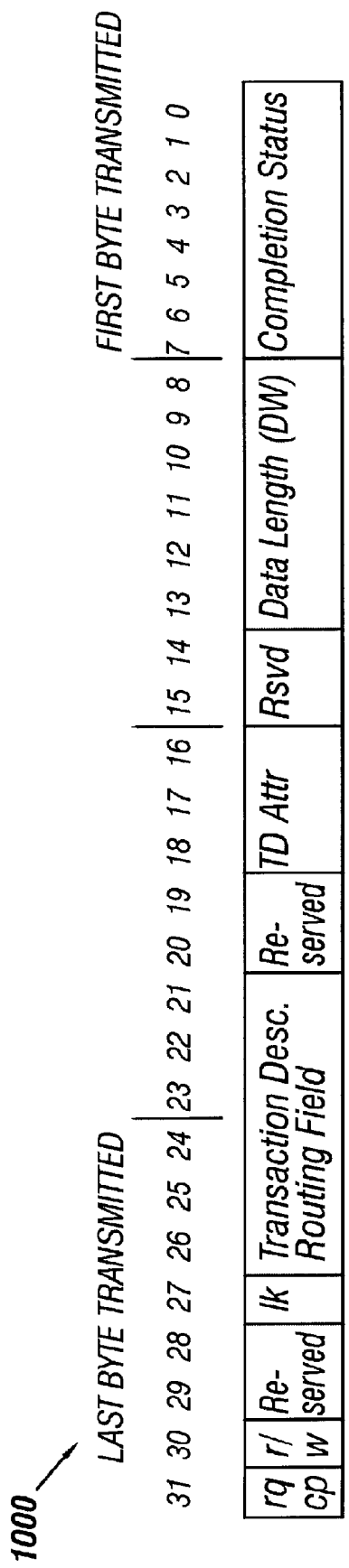
FIG. 10 illustrates, for one embodiment, an exemplary packet header for a completion packet.

Each completion packet may have any suitable information encoded in any suitable format. FIG. 10 illustrates an exemplary completion packet header 1000. For the example of FIG. 10, packet header 1000 has a base header of one double word size. The fields of exemplary packet header 1000 is described in Table 2.

TABLE 2

Completion Packet Header Fields

| | |
|---|---|
| Transaction Descriptor | Transaction routing and attribute fields. |
| rq/cp | Completion packets are identified with a 1 in this location. |
| r/w | Read (0) or Write (1). This field indicates if data is included with a completion (read) or a request (write). |
| Lock (lk) | Flag to indicate that the completion is part of a locked sequence. Requests and completions in a locked sequence have this bit set. Hub agents which do not comprehend lock ignore this flag and fill this field with 0. |
| Data Length | The data length is given in double words encoded such that the number of double words represented is one plus this number. Thus, 000000 represents one double word. |
| Completion Status | Indicates completion status such as successful (0000 0000), master abort (1000 0001), or target abort (1000 0101) for example. |
| Reserved | All reserved bits are set to 0. |

For one embodiment, completions for memory reads may provide less than the full amount of data requested so long as the entire request is eventually completed. Similarly, completions for memory writes may indicate that less than the entire request has been completed. This might be done, for example, to satisfy a particular hub interface latency requirement for a particular platform.

For requests requiring completion, the initiating hub agent for one embodiment retains information about the request. Such information may include the transaction descriptor, the size of the packet, lock status, routing information, etc., and may be stored in a buffer of the initiating hub agent. The initiating hub agent matches each received completion with the corresponding request. For each request having multiple completions, the initiating hub agent for one embodiment maintains a count of the data completed for the request until the request is fully completed.

The hub interface may implement any suitable arbitration to determine which hub agent obtains ownership of the hub interface at any one time. For one embodiment, the assertion of a request from either hub agent interconnected by the hub interface, when the hub interface is idle, is considered an arbitration event. The first hub agent to request obtains ownership of the hub interface. If hub agents request ownership simultaneously when the hub interface is idle, the winning hub agent is determined in accordance with a suitable predetermined criteria. For one embodiment, the least recently serviced hub agent wins, where all hub agents track the least recently serviced status using a status flag of an internal register, for example.

A hub agent that has obtained ownership of a hub interface continues to own the hub interface for one embodiment until that hub agent completes its transaction or until an allocated time period expires. Each hub agent for one embodiment has a timeslice counter to control bandwidth allocation and to limit ownership of the hub interface by that hub agent. The time allotted to a hub agent, that is the timeslice value, may be the same or may vary for hub agents interconnected by the same hub interface. The timeslice counter for a hub agent is started upon the hub agent acquiring ownership of the hub interface and counts hub interface base clock periods. Each hub agent for one embodiment is responsible for managing its own timeslice allocation. The timeslice value may be programmed using a hub interface specific configuration register, for example, for each hub interface in each hub agent.

Figure 11:
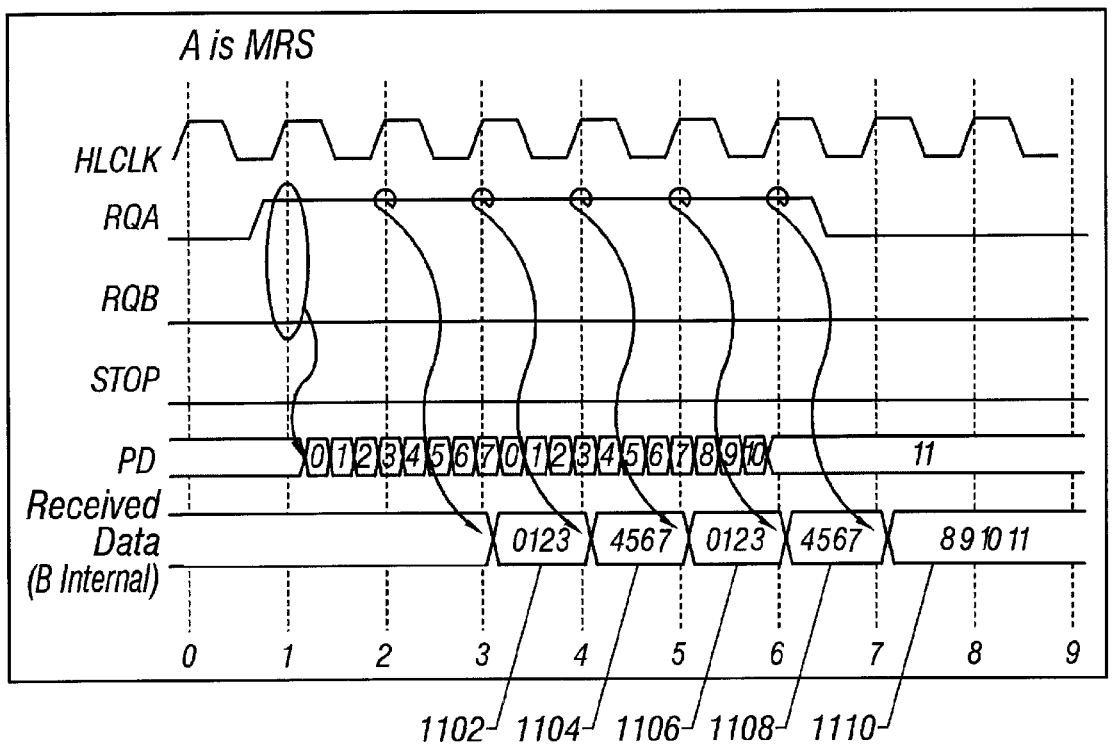
FIG. 11 illustrates, for one embodiment, an example of arbitration for a hub interface.

FIG. 11 illustrates an example of arbitration for a hub interface between a hub agent A and a hub agent B and the transfer of two packets. The example illustrates arbitration out of an idle hub interface state, with the hub interface then returning to idle. For the example, the hub interface uses a 4x data transfer mode with an 8-bit data signal path (PD), and hub agent A is the most recently serviced (MRS) hub agent. Hub agent A asserts its external request signal (RQA) on clock edge 0 and samples the state of hub agent B's request signal (RQB) on clock edge 1. As hub agent B's request signal (RQB) is inactive, hub agent A starts packet transmission off the same edge. For one embodiment, the availability of the transmitted packets received by hub agent B is delayed by two clocks, starting from clock edge 3. The first packet comprises two double words 1102 and 1104 and requires two base clocks to transmit in the 4x mode. The second packet comprises three double words 1106, 1108, and 1110 and requires three base clocks in the 4x mode.

For one embodiment, packets may be retried or disconnected by a receiving hub agent due to lack of request queue space or data buffer space or other suitable reasons. For one embodiment, such flow control may be accomplished using a STOP signal.

Figure 12:
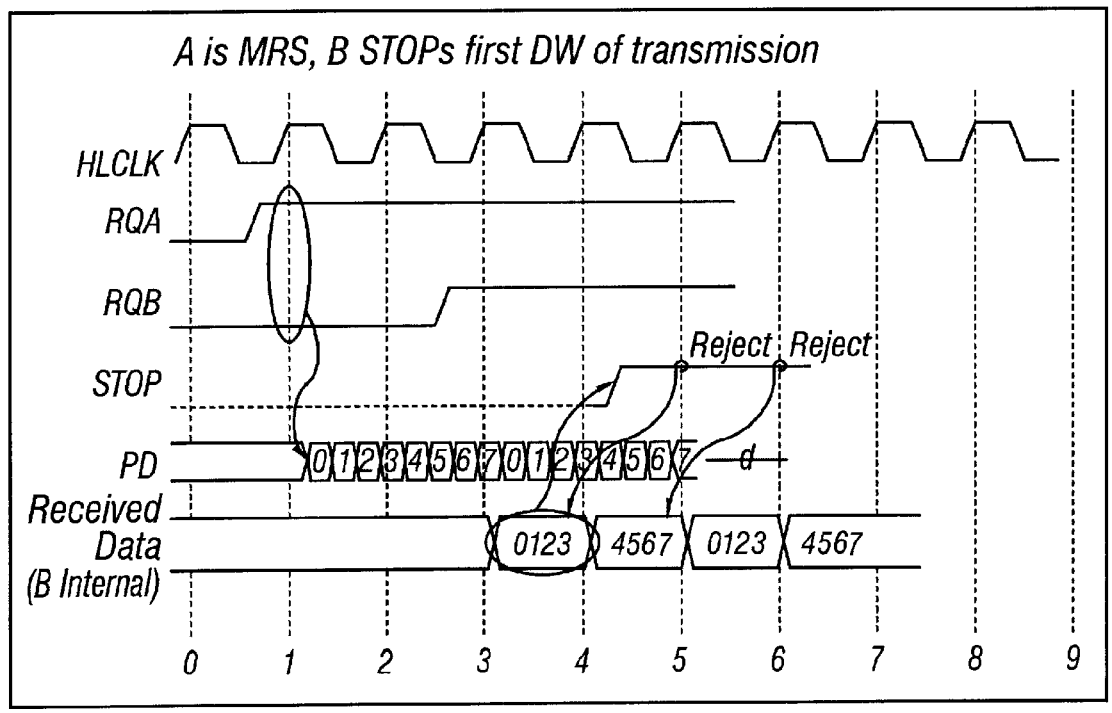
FIG. 12 illustrates, for one embodiment, an example of flow control over a hub interface.

FIG. 12 illustrates one exemplary use of a STOP signal for flow control over a hub interface interconnecting a hub agent A and a hub agent B. For the example, the hub interface uses a 4x data transfer mode with an 8-bit data signal path (PD), and hub agent A is the most recently serviced (MRS) hub agent. Hub agent A asserts its external request signal (RQA) and samples the state of hub agent B's request signal (RQB) on clock edge 1. As hub agent B's request signal (RQB) is inactive, hub agent A starts packet transmission off the same edge. For one embodiment, the availability of the transmitted packets received by hub agent B is delayed by two clocks, starting from clock edge 3. Following receipt of the transmitted packets, hub agent B for one embodiment may enact flow control by asserting the STOP signal at clock edge 4.

Figure 13:
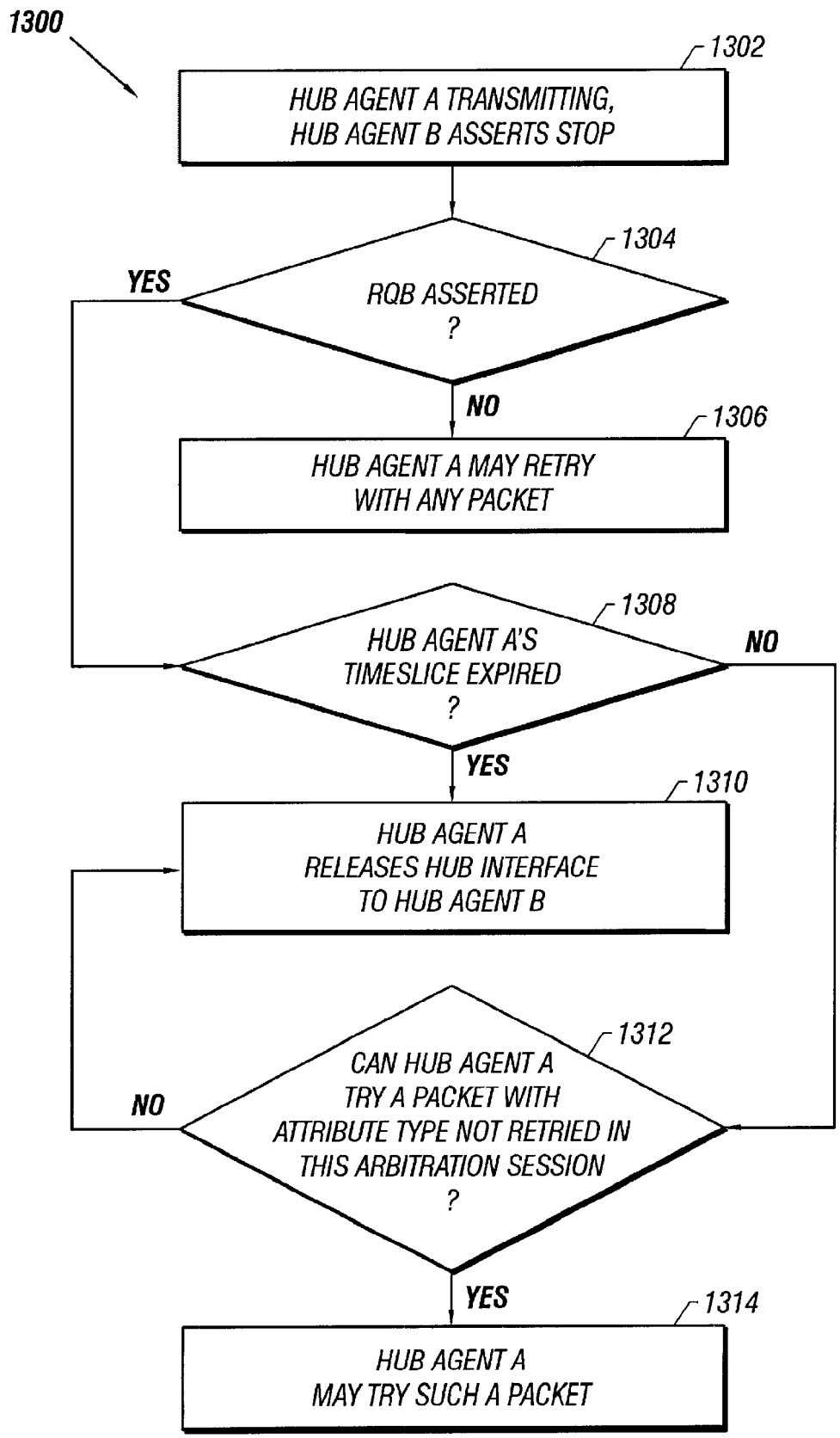
FIG. 13 illustrates, for one embodiment, a flow diagram for flow control over a hub interface.

Following reception of the STOP signal, hub agent A for one embodiment determines whether it may retry sending the transmitted packets in accordance with a flow diagram 1300 of FIG. 13. For 1302 of FIG. 13, hub agent A receives the STOP signal. Hub agent A for 1304 determines if hub agent B is requesting ownership of the hub interface by sampling hub agent B's request signal (RQB). If not, hub agent A for 1306 may attempt to transmit a packet following recovery from stopping transmission. Otherwise, hub agent A for 1308 determines if its timeslice has expired, and, if so, releases ownership of the hub interface for 1310. If hub agent A's timeslice has not expired, hub agent A for 1312 determines whether a packet with an attribute type that is different from any packet retried in the present arbitration session, that is during hub agent A's current ownership of the hub interface, may be retried. If so, hub agent A for 1314 may retry such a packet. Otherwise, hub agent A for 1310 releases ownership of the hub interface.

For one embodiment, ownership of the STOP signal is exchanged following a predetermined number of clocks after ownership of the data signal path (PD). Also, the STOP signal for one embodiment is sampled on base clocks, which correspond to the final transfer of a packet width. For transfers in the 4x mode over an 8-bit interface width, the STOP signal is sampled each base clock. For transfers in the 1xmode, the STOP signal is sampled each fourth clock using the beginning of a transaction as a reference point.

PHYSICAL LAYER

At the physical layer, the hub interface may operate at any suitable base frequency. The hub interface for one embodiment uses a suitable source synchronous (SS) data transfer technique that may be clocked to transfer data at any suitable multiplied rate of the base hub interface clock. One suitable SS data transfer technique may be quad-clocked, for example, to transfer data at 4x the base hub interface clock. The hub interface may have any suitable data signal path (PD) interface width and may support any suitable operating voltage based on any suitable signal processing. The hub interface for one embodiment supports a voltage operation of approximately 1.8 volts based on complementary metal oxide semiconductor (CMOS) signaling.

Figure 14:
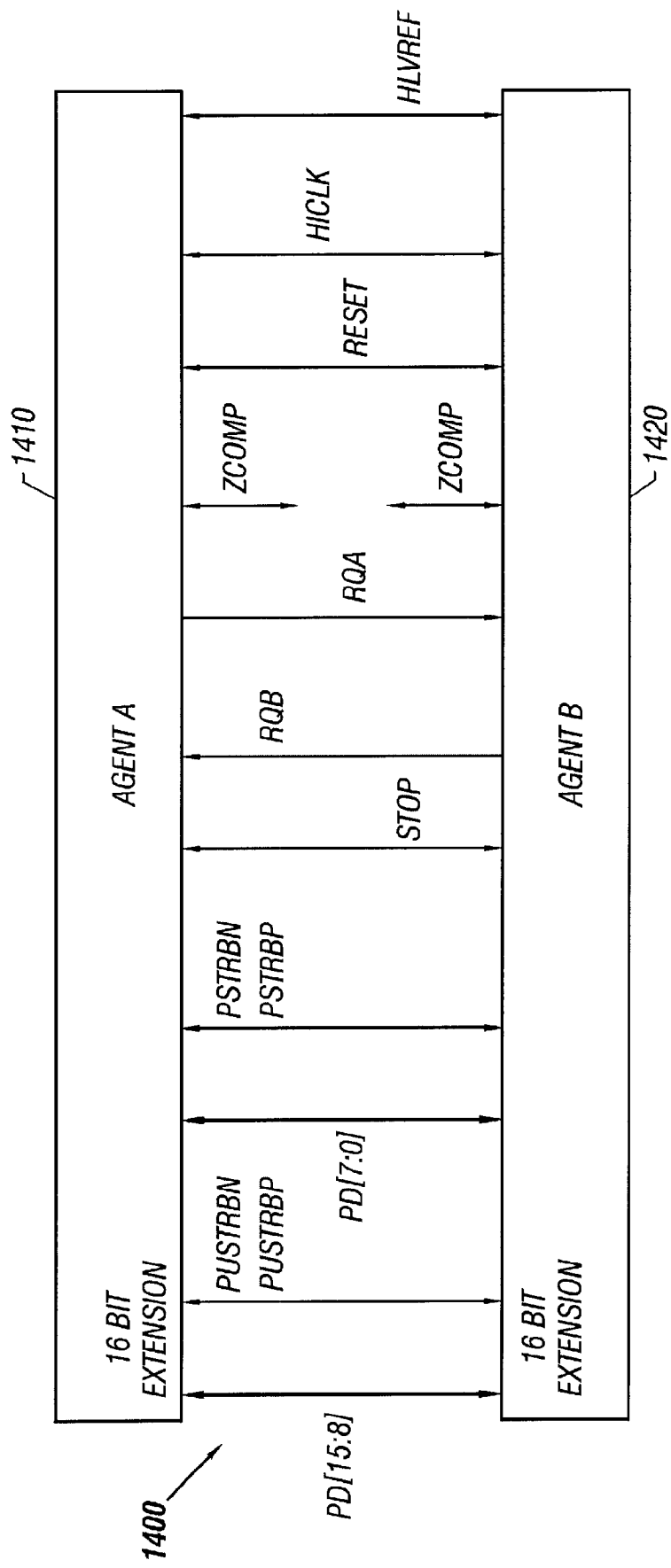
FIG. 14 illustrates, for one embodiment, a hub interface at a physical layer.

The hub interface may have any suitable signal lines at the physical layer. FIG. 14 illustrates, for one embodiment, a hub interface 1400 at the physical layer. Hub interface 1400 interconnects a hub agent A 1410 and a hub agent B 1420. As illustrated in FIG. 14, hub interface 1400 comprises a bidirectional 8-bit data signal path (PD[7:0]) with a differential pair of source synchronous strobe signals (PSTRBN, PSTRBP) for data clocking and an optional additional bidirectional 8-bit data signal path (PD[15:8]) with an additional differential pair of source synchronous strobe signals (PUSTRBN, PUSTRBP). For other embodiments, unidirectional data signal paths may be used. Hub interface 1400 also comprises a unidirectional arbitration request signal (RQA) from hub agent A 1410 to hub agent B 1420, a unidirectional arbitration request signal (RQB) from hub agent B 1420 to hub agent A 1410, and a bidirectional STOP signal used by a receiving hub agent for flow control. Hub interface 1400 further comprises a system reset signal (Reset), a common clock signal (HICLK), a voltage reference signal (HLVREF), and signals (ZCOMP) for each hub agent A 1410 and B 1420 to match its driver output impedance to the appropriate value to compensate for manufacturing and temperature variations. The signals for hub interface 1400 for one embodiment are described in Table 3:

TABLE 3

Hub Interface Signals

| Name | Bits (Pads) | Type | Clock Mode | Description |
|---|---|---|---|---|
| PD[15:0] | 16 | ASTS | SS | Packet data pins. The data interface when idle is held by active sustainers at the last voltage value to which it was driven. |
| PSTRBP | 1 | ASTS | SS | Negative PD Interface Strobe (default voltage level = VSSHL) and Positive PD Interface Strobe (idle voltage level = VCCHL) together provide timing for 4X and 1X data transfer on the PD[7:0] interface. The agent that is providing data drives this signal. PSTRBN and PSTRBP should be sensed fully differentially at the receiver. This strobe is used for PD[7:0]. |
| PSTRBN | 1 | ASTS | SS | Positive PD Interface Strobe, see PSTRBP description above. This strobe is used for PD[7:0]. |

TABLE 3-continued

Hub Interface Signals

| Name | Bits (Pads) | Type | Clock Mode | Description |
|---|---|---|---|---|
| PUSTRBN | 1 | ASTS | SS | Positive PD Interface Strobe, see PSTRBP description above. This strobe is used for PD[15:8]. |
| PUSTRBP | 1 | ASTS | SS | Positive PD Interface Strobe, see PSTRBP description above. This strobe is used for PD[15:8]. |
| RQA | 1 | I/O | CC | Active-high request from agent A (output from A, input to B) to become master of the hub interface. RQA is asserted when agent A has data available to send, and is deasserted when either all of agent A's data has been sent or agent A determines that it should release the interface. Reset voltage value is VSSHL. |
| RQB | 1 | I/O | CC | Request from agent B (output from B, input to A). See above description of RQA. |
| STOP | 1 | ASTS | CC | Used for pipelined flow control to retry or disconnect packets. |
| HICLK | 1 | I | N/A | Hub interface base clock, either 66 MHz or 100 MHz. This provides timing information for the common clock signals. |
| RESET# | 1 | I | CC | Active-low reset indication to all hub agents. Reset is a system-wide signal that is an output from one component of a system and an input to the other component(s). It is asynchronous with respect to HICLK. |
| HLVREF | 1 | I | N/A | Voltage reference (VCCHL/2) generated through a voltage divider, for example, for differential inputs. |
| HLZCOMP | 1 | I/O | N/A | Connected to measure output step voltage of PD[7:0], PSTRBN, and PSTRBP driver transistors for impedance matching. |
| VCCHL | 9 | power | N/A | 1.8 V |
| VSSHL | 9 | ground | N/A | |
| Total: | 45 | | | | where ASTS is Actively Sustained Tri-State (weakly holds last value driven), SS is Source Synchronous Mode Signal, and CC is Common Clock Mode Signal.

Common clock mode signals, such as RQA, RQB, and STOP for example, are referenced to hub interface base clock HICLK. For one embodiment, hub interface base clock HICLK is referenced to a system clock exterior to hub agents. Also, where a system has more than one hub interface segment, different base clocks may be used for different segments. As one example, a hub agent may implement both a 66 MHz hub interface and a 100 MHz hub interface.

Source synchronous mode signals, such as data signals PD[15:0], are transferred at a multiplied data transfer rate. As one example, a double word may be transferred over an 8-bit data signal path using a 4× source synchronous clocking mode in only one hub interface clock (HICLK). A double word transferred over an 8-bit data signal path using a 1× source synchronous clocking mode would require four hub interface clocks (HICLK).

Strobes PSTRBP and PSTRBN are sent with a data transmission over data signal path PD[7:0] in accordance with a suitable predetermined timing relationship between the strobes and the data. Strobes PUSTRBP and PUSTRBN are sent with a data transmission over data signal path PD[15:8] in accordance with a suitable predetermined timing relationship between the strobes and the data. Such strobes are used to latch the corresponding data into the receiving hub agent. For both data signal paths PD[7:0] and PD[15:8], the edges of the corresponding strobes are used by the receiving hub agent to identify the presence and timing of data being transferred across the corresponding data signal path.

Figure 15:
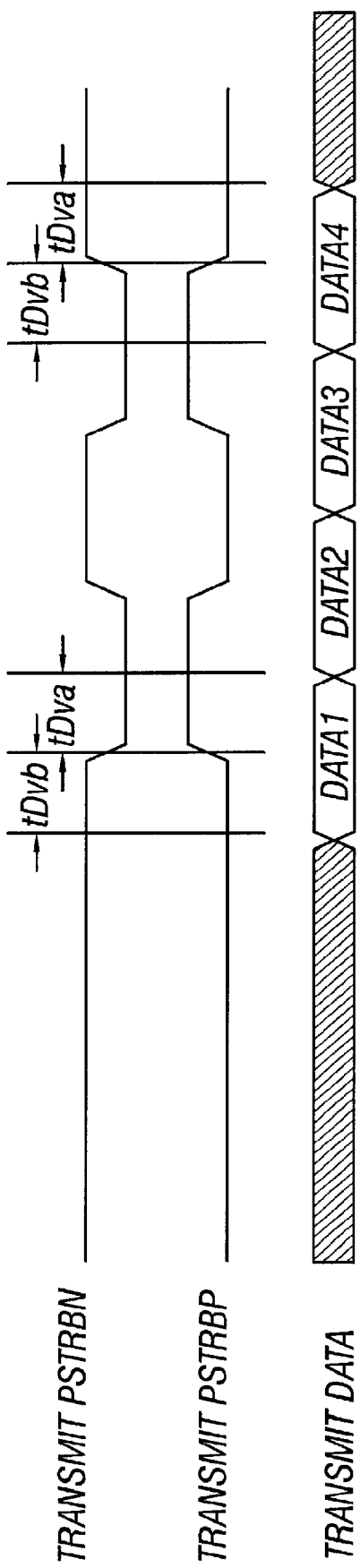
FIG. 15 illustrates, for one embodiment, an example of a source synchronous transmission over a hub interface.

Strobes PSTRBP and PSTRBN and/or strobes PUSTRBP and PUSTRBN may be used in accordance with any suitable strobing technique, such as the strobing technique illustrated in FIG. 15 for example. As illustrated in the example of FIG. 15, a first data transfer on PD[7:0] corresponds to the rising edge of PSTRBP and the falling edge of PSTRBN. A second data transfer on PD[7:0] corresponds to the rising edge of PSTRBN and the falling edge of PSTRBP. The transmit edges of the strobes PSTRBP/PSTRBN are positioned near the center of the data valid window. As a result, the receiving hub agent is given an input data sampling window to accommodate various system timing skews. Also, a minimum data valid before strobe edge (tDvb) and a minimum data valid after strobe edge (tDva) are used by the receiving hub agent to identify and latch data being transmitted. Once the receiving hub agent latches the incoming data, the data is thereafter held for a brief period to resynchronize the data with the hub interface clock (HICLK) before being passed along in the receiving hub agent.

HUB INTERFACE PCI CONFIGURATION EMULATION

As I/O device and system software manufacturers have come to rely on the PCI bus, systems incorporating the hub interface, such as system 100 for example, may implement a hub interface configuration mapping mechanism that emulates the PCI configuration space programming model in accordance with a suitable PCI Specification, such as the PCI Specification Revision 2.2 for example. For this model, each hub interface of the system appears as a logical PCI bus. The system may then remain compliant with PCI bus enumeration and configuration software, such as plug and play for example.

Similarly as for PCI devices, each hub agent of a system for one embodiment defines a suitable configuration space in accordance with a suitable PCI specification for software-driven initialization and configuration. For one embodiment, each hub agent provides, for example, 256 bytes of configuration register space for each function of each device. Where possible, such registers are organized to correspond with the format and behavior defined by a PCI Specification. Because the hub interface and PCI are physically different, some configuration register fields in a hub agent may be mapped to functions that are only analogous to a corresponding PCI function. As one example, the PCI parity error (PERR) status bit may indicate the detection of data integrity errors that occurred during transactions over a hub interface.

Using system 100 as an example, ICH 140 contains the base I/O portion of the core logic, including the PCI compatibility and legacy functions, and MCH 120 contains the rest of the core logic for system 100. Hub interface B for one embodiment is mapped as bus number 0 and is the logical equivalent of the primary PCI bus from the point of view of connecting the main core logic building blocks. MCH 120 and ICH 140 are logically equivalent to the North Bridge and South Bridge, respectively, of platforms that use PCI as a core logic interconnect.

Memory interface controller 122, graphics interface controller 124, and hub interface controller 126 are logical devices that are internal to MCH 120 and that are seen from the configuration point of view as PCI devices residing on bus number 0. Hub interface controller 142, hub interface controller 144, and PCI bridge 146 are logical devices that are internal to ICH 140 and that are seen from the configuration point of view as PCI devices residing on bus number 0. To help minimize implementation complexity and to allow a default path to a suitable boot read only memory (ROM) device, bus number 0 assumes a fixed allocation of device resources between MCH 120 and ICH 140 devices.

PCI bus 147, that is the real primary PCI bus, for one embodiment is mapped as bus number 1 and is visible through PCI bridge 146 which couples bus number 0 to bus number 1. PCI bridge 146 for one embodiment is mapped in configuration space as device number 30, for example, of bus number 0.

Device identifiers for the PCI-like configuration mapping mechanism supported by the hub interface may be assigned in any suitable manner. For one embodiment, logical device(s) of a downstream hub agent may each be mapped onto the upstream hub interface in any suitable manner. Logical device(s) of an upstream hub agent for one embodiment may not be mapped onto the downstream hub interface unless the downstream hub interface interconnects a base I/O component hub agent, such as ICH 140 for example. If logical devices of an upstream hub agent are to be mapped onto the downstream hub interface, device identifiers for one embodiment are split between the upstream and downstream hub agents. Device identifiers for one embodiment may be assigned statically when the device is designed.

Using system 100 as an example, MCH 120 maps its logical devices onto hub interface B because hub interface B interconnects ICH 140. MCH 120 for one embodiment uses device numbers 0–15, and ICH 140 uses device numbers 16–31. Memory interface controller 122, graphics interface controller 124, and hub interface controller 126 may be assigned, for example, device numbers 0, 1, and 2, respectively, on bus number 0. Hub interface controller 142, hub interface controller 144, and PCI bridge 146 may be assigned, for example, device numbers 28, 29, and 30, respectively, on bus number 0. For hub interface A, the upstream hub agent MCH 120 does not map any device numbers onto the downstream hub interface A. Bridge 127 may map its devices onto hub interface A in any suitable manner. For hub interfaces C and D, the upstream hub agent ICH 140 does not map any device numbers onto the downstream hub interfaces C and D. Network interface controller 143 and fiber channel 145 may each map their respective devices onto hub interfaces C and D, respectively, in any suitable manner.

If a hub agent receives a configuration access request targeting a device number within a device number range for the hub agent and the hub agent does not have a corresponding device, the hub agent for one embodiment generates a master abort completion.

On a real PCI bus, a device number is assigned geographically with the connection of a specific identifier select (IDSEL#) signal to a device, such as by plugging a card into a particular PCI slot for example. The device number is encoded onto mutually exclusive IDSEL# signals during PCI Type 0 configuration transactions. On the hub interface, however, an encoded device number is provided during configuration transactions. Hub interface target devices use assigned device numbers to determine whether or not to respond.

Figure 16:
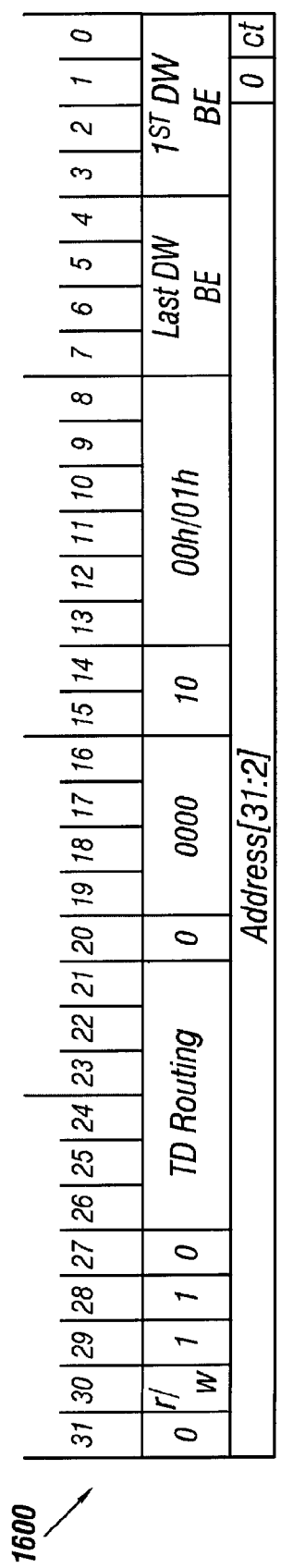
FIG. 16 illustrates, for one embodiment, a hub interface request packet used to initiate configuration accesses.

FIG. 16 illustrates, for one embodiment, a hub interface request packet 1600 used to initiate configuration accesses. The hub interface for one embodiment requires completion of both configuration reads and writes. Configuration access request and completion packets may each have any suitable information encoded in any suitable format, such as the formats for the request and completion packets of FIGS. 8 and 10 for example.

For one embodiment, a configuration access request packet comprises an address field formatted in accordance with a suitable PCI specification. Such an address field identifies a register number, function number, a device number, and/or a bus number.

The register number is an encoded value used to index a register or predetermined portion of the configuration space of an intended target device. The register number field may comprise any suitable number of bits to identify any suitable configuration space portion. The register number for one embodiment comprises six bits to identify a particular one of 64 data words in a 256 byte configuration space for an intended target function of the intended target device.

The function number is an encoded value used to select a particular one of one or more functions of the intended target device. The function number field may comprise any suitable number of bits to identify any suitable number of functions per device. The function number field for one embodiment comprises three bits to identify a particular one of up to eight functions of the intended target device.

The device number is an encoded value used to select a particular device on an intended target logical PCI bus, such as an intended hub interface or PCI bus for example. The device number field may comprise any suitable number of bits to identify any suitable number of devices. The device number field for one embodiment comprises five bits to identify a particular one of up to thirty-two devices on the intended target logical PCI bus.

The bus number is an encoded value used to select a particular logical PCI bus in a system. The bus number field may comprise any suitable number of bits to identify any suitable number of logical PCI buses. The bus number field for one embodiment comprises eight bits to identify a particular one of up to 256 logical PCI buses in a system.

A hub agent may transmit a configuration access request packet onto a hub interface for reception by another hub agent. If the receiving hub agent comprises the intended target device for the configuration access request, the receiving hub agent performs the configuration access request. The receiving hub agent accesses the intended target configuration space portion for the intended target function of the intended target device on the intended target logical PCI bus in accordance with the received configuration access request. If the intended target device is mapped onto another logical PCI bus and/or onto a logical PCI bus for another hub agent, for example, the receiving hub agent transmits the configuration access request onto the appropriate logical PCI bus. For one embodiment, one or more corresponding completion packets are returned to the initiating hub agent once the configuration access request has been performed.

Figure 17:
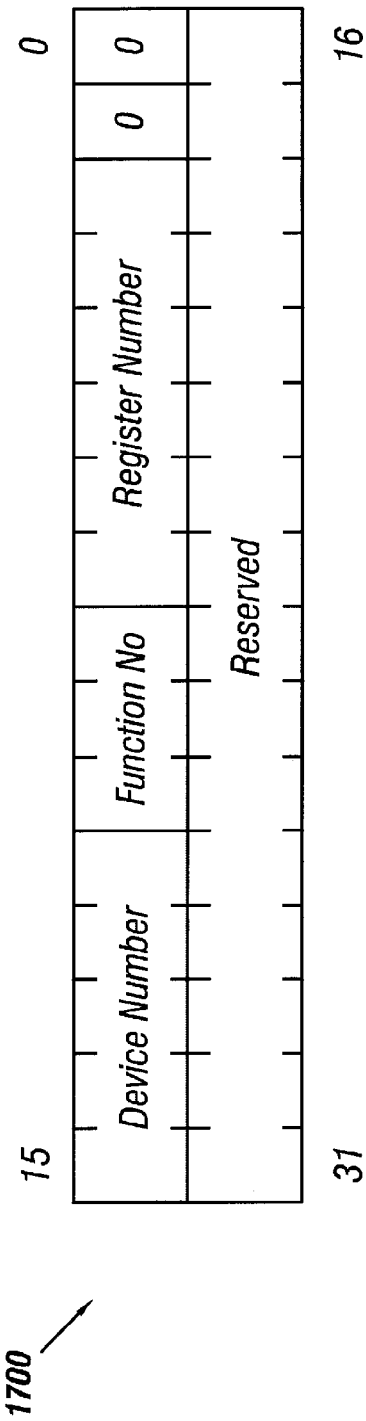
FIG. 17 illustrates, for one embodiment, a PCI Type 0 address field for hub interface configuration access request packets.
Figure 18:
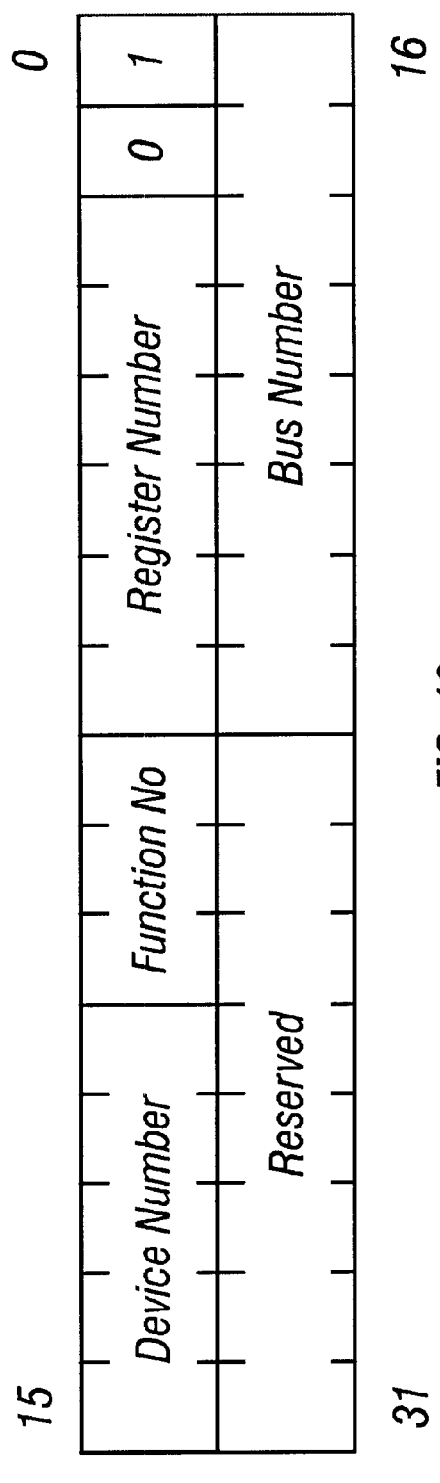
FIG. 18 illustrates, for one embodiment, a PCI Type 1 address field for hub interface configuration access request packets.

Two formats corresponding to PCI Type 0 and Type 1 configuration address formats are defined for the address field of a configuration access request packet for one embodiment to support hierarchical hub link interfaces and/or PCI buses. FIG. 17 illustrates an exemplary PCI Type 0 address field 1700 for hub interface configuration access request packets. FIG. 18 illustrates an exemplary PCI Type 1 address field 1800 for hub interface configuration access request packets. Type 0 and Type 1 configuration requests are differentiated by the values for bits 0 and 1 in the illustrated request packet address field. The bus number field is not necessary for Type 0 requests but may be included to simplify implementation.

A Type 0 configuration access request is used to select a device on the initiating logical PCI bus. A Type 1 configuration access request is used to pass a configuration transaction on to another logical PCI bus by a bridge. As non-bridge agents do not know their bus numbers for one embodiment, distinct Type 0 and Type 1 configuration request types are used. Type 0 configuration access requests for one embodiment are not propagated beyond the local logical PCI bus. If a hub agent receives a Type 0 configuration access request for a logical device that is not present or for a function number for which configuration space has not been implemented, the hub agent for one embodiment generates a master abort completion packet. For one embodiment, a master abort completion packet for any configuration read transaction returns a data value of FFFFh.

Type 1 configuration access requests are propagated across bridges to other logical PCI buses. If a hub agent receives a Type 1 configuration request and the hub agent is not a bridge interconnecting hub interfaces (HI-to-HI bridge) or a bridge interconnecting a hub interface and a PCI bus (HI-to-PCI bridge), the device for one embodiment returns a master abort completion. When a HI-to-HI or HI-to-PCI bridge receives a Type 1 configuration request, it decodes the bus number field to determine if the destination of the configuration request resides behind the bridge. If not, the bridge returns a master abort completion. Following the PCI bridge model, the bridge for one embodiment has logical bus range registers which are set according to the logical bus numbers mapped behind the bridge. If the decoded bus number is not to the secondary logical bus of the bridge, but is within the range of logical busses mapped behind the bridge, the bridge for one embodiment passes the configuration request through unchanged. If the decoded bus number matches the secondary logical bus number, the bridge for one embodiment converts the request into a Type 0 configuration request and passes the converted request onto the secondary logical bus.

PCI bus enumeration and configuration software in basic input/output system (BIOS) and/or operating system (OS) software, for example, may be used to configure and operate systems implementing the hub interface, such as system 100 for example. For one embodiment, address spaces are allocated by the BIOS and/or OS using base address registers that comply with a suitable PCI Specification. The programming of these registers for one embodiment may be part of conventional PCI BIOS and/or OS initialization.

The configuration software configures each hub agent as one or more logical PCI devices with one or more functions per device. Logical PCI device configuration space implementation conforms to a suitable PCI Specification. Each subordinate hub interface, such as hub interfaces A, C, and D of system 100 for example, is, from the configuration point of view, seen through a virtual PCI-to-PCI bridge. This allows configuration of a system with hierarchically connected hub interface devices to be performed with existing PCI BIOS and/or OS initialization and plug-and-play configuration software, for example. The initialization of virtual PCI-to-PCI bridges in a hub interface based system, for one embodiment, may follow the mechanism defined in PCI-to-PCI Bridge Architecture Specification Revision 1.0, for example.

Configuration space definitions for systems implementing the hub interface are subject to the same practical considerations as in a PCI based implementation of similar devices. As one example, if a device does not implement a particular function specified by a PCI Specification, the corresponding register need not be implemented. For each function performed by each device that differ from or do not conform to a PCI Specification, the device may contain one or more hub interface or hub agent specific configuration registers for the function. Each such register may be used by a suitably programmed BIOS to control its corresponding function.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
   transmitting a configuration access request packet from a first hub agent onto a hub interface, the configuration access request packet comprising an address formatted in accordance with a peripheral component interconnect (PCI) specification; and
   receiving the configuration access request packet from the hub interface by a second hub agent.

2. The method of claim 1, wherein the address identifies a logical device of the second hub agent and wherein the method comprises accessing configuration space for the identified logical device.

3. The method of claim 1, comprising transmitting the configuration access request packet by the second hub agent onto another hub interface in accordance with the address.

4. The method of claim 3, wherein the address identifies the other hub interface or a bus coupled to the other hub interface.

5. The method of claim 1, comprising transmitting a corresponding completion packet from the second hub agent onto the hub interface to the first hub agent.

6. The method of claim 1, wherein the transmitting comprises arbitrating for ownership of the hub interface by the first hub agent.

7. The method of claim 1, wherein the transmitting comprises dividing the configuration access request packet into more than one packet width.

8. The method of claim 1, wherein the transmitting comprises transmitting the configuration access request packet using a source synchronous transmission technique.

9. A system comprising:
   first and second hub agents to communicate over a hub interface, each hub agent defining configuration space in accordance with a peripheral component interconnect (PCI) specification;
   the first hub agent to transmit onto the hub interface a configuration access request packet comprising an address formatted in accordance with the PCI specification; and
   the second hub agent to receive the configuration access request packet from the hub interface.

10. The system of claim 9, wherein each hub agent comprises one or more logical devices.

11. The system of claim 10, wherein the address identifies a logical device of the second hub agent and the second hub agent accesses configuration space for the identified logical device.

12. The system of claim 9, wherein the second hub agent transmits the configuration access request packet onto another hub interface in accordance with the address.

13. The system of claim 12, wherein the address identifies the other hub interface or a bus coupled to the other hub interface.

14. The system of claim 9, wherein the second hub agent transmits a corresponding completion packet onto the hub interface to the first hub agent.

15. The system of claim 9, wherein the first and second hub agents arbitrate for ownership of the hub interface.

16. The system of claim 9, wherein the first hub agent divides the configuration access request packet into more than one packet width for transmission onto the hub interface.

17. The system of claim 9, wherein the first hub agent transmits the configuration access request packet using a source synchronous transmission technique.

18. The system of claim 9, wherein the first hub agent is a memory control hub agent and the second hub agent is an input/output control hub agent.

19. The system of claim 9, comprising a PCI bus coupled to the second hub agent.

20. A system comprising:

a processor;

a main memory;

a memory control hub agent coupled to the processor and the main memory;

an input/output control hub agent coupled to the memory control hub agent by a hub interface; and the memory control hub agent and the input/output control hub agent each defining configuration space in accordance with a peripheral component interconnect (PCI) specification, the memory control hub agent to transmit onto the hub interface a configuration access request packet comprising an address formatted in accordance with the PCI specification, the input/output control hub agent to receive the configuration access request packet from the hub interface.

21. The system of claim 20, wherein the memory control hub agent and the input/output control hub agent each comprises one or more logical devices.

22. The system of claim 21, wherein the address identifies a logical device of the input/output control hub agent and the input/output control hub agent accesses configuration space for the identified logical device.

23. The system of claim 20, wherein the input/output control hub agent transmits the configuration access request packet onto another hub interface in accordance with the address.

24. The system of claim 23, wherein the address identifies the other hub interface or a bus coupled to the other hub interface.

25. The system of claim 20, wherein the input/output control hub agent transmits a corresponding completion packet onto the hub interface to the memory control hub agent.

26. The system of claim 20, wherein the memory control hub agent and the input/output control hub agent arbitrate for ownership of the hub interface.

27. The system of claim 20, wherein the memory control hub agent divides the configuration access request packet into more than one packet width for transmission onto the hub interface.

28. The system of claim 20, wherein the memory control hub agent transmits the configuration access request packet using a source synchronous transmission technique.

29. The system of claim 20, comprising a PCI bus coupled to the input/output control hub agent.

30. The system of claim 20, comprising one or more other hub agents each coupled to the memory control hub agent or to the input/output control hub agent by a hub interface.

* * * * *